United States Patent [19]

Ueda et al.

[11] Patent Number: 5,003,029
[45] Date of Patent: Mar. 26, 1991

[54] FLAME RESISTANT POLYESTER FROM DI ARYL-DI(HYDROXYALKYLENE OXY)ARYL PHOSPHINE OXIDE

[75] Inventors: Atsuko Ueda; Tetsuo Matsumoto; Takayuki Imamura; Keizo Tsujimoto, all of Aichi, Japan

[73] Assignee: Nippon Ester Co., Ltd., Aichi, Japan

[21] Appl. No.: 534,085

[22] Filed: Jun. 6, 1990

[51] Int. Cl.$^5$ ............................................. C08G 63/66
[52] U.S. Cl. ...................................... 528/167; 528/287
[58] Field of Search ............................................. 528/167

[56] References Cited

U.S. PATENT DOCUMENTS

| 4,017,462 | 4/1977 | Daigle et al. | 528/167 |
| 4,157,436 | 6/1979 | Endo et al. | 528/167 |
| 4,556,698 | 12/1985 | Braksmeyer | 525/469 |

Primary Examiner—Harold D. Anderson
Assistant Examiner—T. Mosley
Attorney, Agent, or Firm—Sughrue, Mion, Zinn, Macpeak & Seas

[57] ABSTRACT

A flame resistant polyester produced by addition and copolymerization of a phosphorus compound represented by general formula (I) below as a diol component of the polyester in an amount of 500 ppm or more in terms of phosphorus atom content in the polyester, which polyester has alkylene terephthalate units as main repeating units and which has an intrinsic viscosity of not less than 0.5 measured at 20° C. in a mixture of equal weight of phenol and tetrachloroethane:

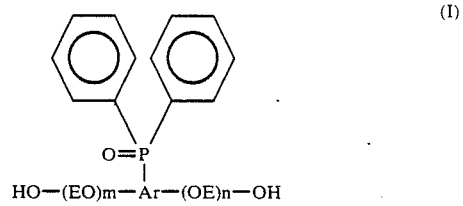

where E is —$CH_2CH_2$—, Ar is an aromatic group or an aromatic group substituted by a lower alkyl group or a halogen atom, and m and n denote, respectively, integers the sum of which is from 1 to 20.

5 Claims, No Drawings

FLAME RESISTANT POLYESTER FROM DI ARYL-DI(HYDROXYALKYLENE OXY)ARYL PHOSPHINE OXIDE

FIELD OF THE INVENTION

The present invention relates to a flame resistant polyester and a flame resistant polyester fiber.

BACKGROUND OF THE INVENTION

Polyesters, in particular, polyethylene terephthalate, having excellent mechanical and chemical properties have widely been used not only in clothes and industrial fibers, but also in magnetic tapes, photographic films, condenser films and molded products such as bottles.

Recently, flame resistance has come to be required in synthetic fibers and in various plastic products from the viewpoint of fire prevention.

Various processes have been proposed for imparting flame resistance to polyesters. Among these processes, the addition of a phosphorus compound to a polyester is considered to be quite effective.

The addition of a phosphorus compound to a polyester, however, generally involves problems such as: (1) the polyester tends to gel; (2) the addition of the phosphorus compound lowers the melting point and the glass transition temperature of the polyester; (3) the ultimate retention ratio of the phosphorus compound is low; (4) the color tone of the polyester is deteriorated; (5) a toxic gas is liable to be evolved in the processes of spinning, stretching, and molding the polyester; etc.

U.S. Pat. No. 4,157,436 discloses a process for producing a fire resistant polyester by copolymerization with a specific phosphinic acid compound. Although this process solves the above described problems to a certain extent, the phosphinic acid compound is expensive, resulting in high polyester production cost due to the addition of such compound in an amount imparting sufficient flame resistance.

JP-A-62-172017 (corresponding to U.S. patent application Ser. No. 438,129 filed on Nov. 20, 1989) discloses a process for producing a flame resistant polyester in which an unsaturated compound is incorporated in a polyester by copolymerization and this product subsequently reacted with a specific phosphinic acid compound. This process allows the production of a flame resistant polyester at a relatively low cost. However, since a phosphorus compound having an active PH bond is reacted with the polyester at high temperature, the process involves the disadvantages that the resulting polyester exhibits a three-dimensional structure to some extent depending on reaction conditions and this lowers the workability thereof upon molding or spinning into fibers or films, or deteriorates the properties of the resulting fibers and films.

SUMMARY OF THE INVENTION

It is an object of the present invention to provide a flame resistant polyester which has excellent flame resistance as well as a high glass transition temperature, and which is superior in color tone, processability and physical properties to fire resistant polyesters of the prior art.

It is also an object of the present invention to provide a flame resistant polyester fiber comprising the above polyester.

The present invention provides a flame resistant polyester by the addition and copolymerization of a phosphorus compound represented by general formula (I) as a diol component of the polyester in an amount of 500 ppm or more in terms of the phosphorus atom content in the polyester, the flame resistant polyester has alkylene terephthalate units, which alkylene group preferably has from 2 to 4 carbon atoms, as main repeating units and has an intrinsic viscosity of not less than 0.5 measured at 20° C. in a mixture of equal weights of phenol and tetrachloroethane:

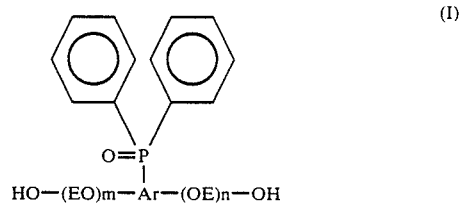

where E is —CH$_2$CH$_2$—, Ar is a trivalent aromatic group having from 6 to 20 carbon atoms, preferably a phenylidyne group (benzene ring) or a naphthylidyne group (naphthalene ring), which may be substituted by a lower alkyl group having from 1 to 8 carbon atoms or a halogen atom, preferably chlorine or bromine (The number of substituents is 3 at most) and m and n denote, respectively, integers the sum of which is from 1 to 20, preferably m and n is respectively 1.

The present invention also provides a fiber comprising the flame resistant polyester described above.

DESCRIPTION OF THE PREFERRED EMBODIMENTS

The polyester which is the base for copolymerization with the phosphorus compound is a polyester mainly constituted of an alkylene terephthalate units, particularly preferably, polyethylene terephthalate and/or polybutylene terephthalate. These are derived from terephthalic acid as a dicarboxylic acid component and ethylene glycol or 1,4-butanediol as a main diol component. As an additional copolymerizing component, if desired or necessary, 4-hydroxybenzoic acid, isophthalic acid, 5-sodium sulfo-isophthalic acid, adipic acid, trimellitic acid, 1,6-hexanediol, diethylene glycol, propylene glycol, 1,4-cyclohexanedimethanol, pentaerythritol, etc., may be used in combination therewith in a small amount (less than 10 mol %).

The phosphorus compound represented by formula (I) can be synthesized by reacting a diphenylphosphine oxide (hereinafter referred to as PPA) represented by structural formula (II) below with a quinone corresponding (capable of being converted) to an aromatic dihydroxy compound in a solvent such as ethyl cellosolve while heating, whereafter ethylene carbonate or ethylene oxide is reacted therewith in a solvent such as ethylene glycol diethyl ether.

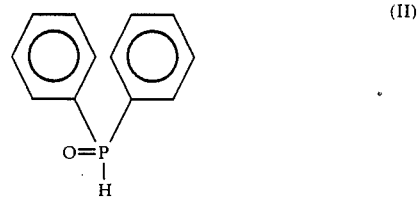

The above mentioned aromatic dihydroxy compounds include hydroquinone, resorcin, 1,4-dihydroxynaphthalene, 2,6-dihydroxynaphthalene, 2,2'-dihydroxydiphenyl, 4,4'-dihydroxydiphenyl,4,4'-dihydroxydiphenyl ether,bis(4-hydroxy-2-methylphenyl) ether, 2,2-bis(4'-hydroxyphenyl)propane, and the like. Particularly preferred are hydroquinone and 1,4-dihydroxynaphthalene.

The reaction of PPA with the quinone may be preferably carried out at a temperature of 90° to 150° C. at a pressure of atmospheric to 3 kg/cm$^2$G for 1 to 5 hours wherein the ratio of the amount of PPA to that of the quinone ranges from 0.9 to 1.2.

The reaction product of PPA with the quinone corresponding to the aromatic dihydroxy compound is further reacted with ethylene carbonate or ethylene oxide. In this further reaction, preferably 1 mol of the reaction product is reacted with 2 to 30 mols of the ethylene carbonate or oxide in the presence of a catalyst, preferably in a molar quantity of 0.05 to 0.5 times that of the reaction product of PPA with the quinone, which is a compound, such as a carbonate, chloride, oxide, hydroxide or carboxylate of a metal such as sodium, potassium, etc., in a solvent, which is preferably used in a molar quantity of 3 to 10 times that of the reaction product of PPA with a quinone, such as ethylene glycol, diethylene glycol, xylene, toluene, ethylene glycol monoethyl eter, ethylene glycol diethyl eter, etc., whereby the phosphorus compound represented by formula (I) is synthesized in good yield. It is preferred that this further reaction is carried out at a temperature of 90° to 150° C. at a pressure of atmospheric to 3 kg/cm$^2$G for 2 to 10 hours.

The polyester of the present invention is produced, as described below, by adding the above mentioned phosphorus compound, preferably in the form of a glycol solution, to the reaction system for the polyester synthesis.

The polyester of the present invention is required to have an intrinsic viscosity of not less than 0.5. A polyester having an intrinsic viscosity below 0.5 cannot provide sufficient physical properties in a shaped article such as fibers, films, etc., and thus is not desirable. At an intrinsic viscosity exceeding 0.8, the physical properties are not to be improved and such may lower workability. Therefore, the intrinsic viscosity of the polyester of the present invention is preferably in the range of about 0.5 to about 0.8.

The amount of the phosphorus compound added should not be less, in terms of phosphorus atom content in the polyester, than 500 ppm, and is preferably 1,000 to 30,000 ppm, which corresponds to 0.6 to 28 mol % in terms of the phosphorus diol. Insufficient addition of the phosphorus compound gives insufficient flame resistance to the polyester, while excessive amounts impair desirable properties inherent to the polyester, which is undesirable.

The procedure of producing the polyester of the present invention is described below.

The phosphorus compound of the present invention may be added, as it is, to the reaction system for the polyester production, or otherwise may be added in a form of a monomer, or a polymer derived from reaction with the dicarboxylic acid component of the polyester such as terephthalic acid, isophthalic acid, etc. In the case of using a polymer, the polymerization degree thereof is preferably from 2 to 10.

It is industrially preferred that the addition of the phosphorus compound is practiced in any of the steps including esterification of a dicarboxylic acid and a diol or transesterification between an ester of a dicarboxylic acid and a diol and including the initial stage of polycondensation of the esters and/or the oligomer obtained in the esterification or transesterification step, in the production of the polyester from the dicarboxylic acid component and the diol component.

The polycondensation reaction may be carried out under a reduced pressure of approximately 0.01 to 10 Torr at a temperature of from 240° to 310° C., preferably from 260° to 290° C., until the intrinsic viscosity reaches the desired value (for about 2 to 10 hours).

The polycondensation reaction is carried out in the presence of a catalyst. Examples of the catalyst include commonly employed metal compounds such as a carbonate, chloride, oxide, hydroxide, carboxylate, etc., of antimony, germanium, tin, titanium, cobalt, etc., and organic sulfonic acid compounds such as sulfosalicylic acid, o-sulfobenzoic acid anhydride, etc.

The catalyst may be added in an amount of $1 \times 10^{-5}$ to $5 \times 10^{-2}$ mol, preferably $5 \times 10^{-5}$ to $5 \times 10^{-3}$ mol, and still more preferably $1 \times 10^{-4}$ to $3 \times 10^{-3}$ mol, per mole of the total acid component(s) of the polyester in the reaction system.

In the present invention, various additives, for example, a stabilizer such as a hindered phenol; a color modifier such as a fluorescent agent; and a dye and/or a pigment such as titanium dioxide may further be employed.

The polyesters of the present invention are useful to form fibers, films, bottles, and so on, in accordance with the properties thereof. Polyesters containing a large amount of phosphorus are useful as flame retardants for polyesters and the like. Above all, polyesters derived as above are suitably melt spun for use for flame resistant polyester fiber.

The method for producing a flame resistant fiber comprising the polyester according to the present invention is described below.

The fiber is generally produced, according to a conventional method described, for example, in U.S. Pat. No. 4,712,366 wherein the polyester containing the desired amount of phosphorus atoms without a further treatment is melt spun, and subsequently stretched. Also, a polyester containing phosphorus atoms in a higher content than the desired amount may be blended and spun with a polyester which does not contain phosphorus atoms before the melt spinning.

The fiber, after melt spinning, is stretched and heat treated either immediately thereafter or separately from spinning according to the need, and may then be subjected to further conventional processing such as crimping, chemical treatment, and the like.

The polyester and the polyester fiber of the present invention are considered to exhibit satisfactory flame resistance due to the action of the phosphorus compound which promotes the thermal decomposition and dehydration of the polyester to facilitate the melt dropping thereof instead of the rapid combustion thereof.

The phosphorus compounds of the present invention are remarkably stable thermally, and, additionally, do not cause gelation of the polyester.

The following examples are given to further illustrate the present invention but the present invention is not to be construed as being limited thereto.

In the examples, the characteristic values of the polyesters are measured as below.

(a) Color tone

The values of L, a, and b were measured by the use of a differential colorimeter.

The value "L" indicates lightness (lighter at higher values), the value "a" indicates a hue in the range from red to green ("+" means more reddish, and "−" means more greenish). The value "b" indicates a hue in the range from yellow to blue ("+" means more yellowish and "−" means more bluish). The tone of the polymer is more desirable if the L-value is higher, the a-value is closer to zero, and the b-value is low but not extremely low.

(b) Phosphorus atom content

The phosphorus atom content was determined by X-ray fluorescence analysis.

(c) Melting point (Tm) and glass transition temperature (Tg)

Measurement was conducted with a differential thermal scanning calorimeter (Model DSC-2, made by Perkin Elmer Co.) at a temperature elevation rate of 20° C./min.

(d) Flame resistance

A polyester fiber was melt spun and stretched in a conventional manner. The yarn thus prepared was knit into the form of a cylinder. 1 g of the knit article was rounded to a length of 10.0 cm and inserted into a wire coil 10.0 mm in diameter. Supported at an angle of 45° to the plane, it was ignited at its lower end with a microburner having a 0.64 mm diameter bore. The microburner was then removed from the sample. When the fire then extinguished itself, the ignition was repeated. The number of the ignitions, i.e., the number of times of contact with the flame needed to completely burn the sample was recorded. The flame contact number was expressed as the mean value for five samples.

(e) Limiting Oxygen Index (LOI)

Measurement was conducted according to ASTM D 2863.

(f) Intrinsic viscosity

Measurement was conducted at 20° C. on the solution which is prepared by adding 0.2 g of sample to 40 ml of mixture of equal weight of phenol and tetrachloroethane followed by heating at 100° C. for 35 minutes to dissolve it.

REFERENCE EXAMPLE

1

PPA was reacted with p-benzoquinone (at a p-benzoquinone/PPA mol ratio of 1.1) at 125° C. and atmospheric pressure for 2 hours in ethyl cellosolve to give a phosphine oxide (hereinafter referred to as PPQ).

0.1 mol of this PPQ and 0.3 mol of ethylene carbonate were put into a glass flask. Then, 0.01 mol of potassium carbonate as the catalyst and 0.5 mol of ethylene glycol diethyl ether as the solvent were added thereto and the mixture was reacted, with stirring, at 100° C. and atmospheric pressure for 6 hours, yielding a white crystalline material.

The resulting crystalline material was a compound represented by formula (A) below.

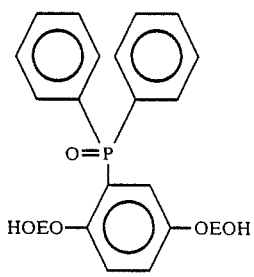

cl 2

The compound represented by formula (B) below was prepared in the same manner as above except that 1,4-naphthoquinone was used in place of the p-benzoquinone.

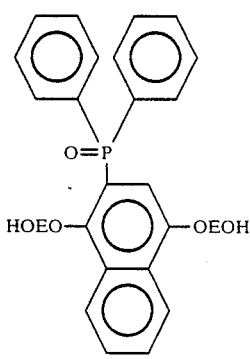

EXAMPLES 1-4

Bis($\beta$-hydroxyethyl)terephthalate and a low polymer thereof (the polymerization degree of from 2 to 10) (BHET) were introduced into an esterification tank and a slurry comprising terephthalic acid (TPA) and ethylene glycol (EG) at an EG/TPA mol ratio of 1.6 was continuously supplied thereto. The mixture was allowed to react at 250° C. and 0.05 kg/cm$^2$G with an average residence time of 8 hours. BHET which had a polymerization degree of from 2 to 10 was thus obtained continuously at a conversion of 95%.

The resulting BHET was transferred to a polymerization tank, and was heated to 280° C. There was added thereto a 30% by weight solution in EG of phosphorus compound (A) or (B) prepared in the Reference Example, in an amount which gave phosphorus compound concentration shown in the Table in the final polyester, and $2 \times 10^{-4}$ mol of dimethyltin maleate was added as a catalyst per each mol of the acid component to carry out a polycondensation reaction at 285° C. and 0.4 Torr for 3 hours, whereby a polyester was prepared.

The resulting polyester was melt spun at a spinning temperature of 290° C. and a spinning speed of 1,400 m/min in a conventional manner, and then stretched between a feeding roller at a temperature of 90° C. and a stretching roller while contacting with a hot plate at a temperature of 105° C. at a stretch ratio of 3.0, thereby giving a polyester fiber of 75d/36f.

The properties of the polyester and the polyester fiber described above are given in the Table.

COMPARATIVE EXAMPLE 1

BHET was introduced into an esterification tank and a slurry comprising TPA and EG at EG/TPA mol ratio of 1.6 was continuously supplied thereto. The mixture was allowed to react at 250° C. and 0.05 kg/cm²G with an average residence time of 8 hours. BHET was thus obtained continuously at a conversion of 95%.

The resulting BHET was transferred to a polymerization tank and was heated to 280° C. These was then added thereto a 30% by weight solution in EG of phosphorus compound (A), prepared in the Reference Example, in an amount which gave a phosphorus compound concentration in the final polyester of 5 mole %, and $2 \times 10^{-4}$ mol of antimony trioxide was added as a catalyst per mol of the acid component to carry out a polycondensation reaction at 285° C. and 0.4 Torr, whereby a polyester having an intrinsic viscosity of 0.45 was prepared.

The resulting polyester was melt spun in a conventional manner. Although spinning was possible, the yarn had low strength and winding up of the yarn was impossible.

COMPARATIVE EXAMPLE 2

BHET was introduced into an esterification tank and a slurry comprising TPA and EG at an EG/TPA mol ratio of 1.6 was continuously supplied thereto. The mixture was allowed to react at 250° C. and 0.05 kg/cm²G with an average residence time of 8 hours. BHET was thus obtained continuously at a conversion of 95%.

The resulting BHET was transferred to a polymerization tank and was heated to 280° C. There was then added thereto a 30% by weight solution in EG of phosphorus compound (A), prepared in the Reference Example, in an amount which gave a phosphorus compound concentration in the final polyester of 0.3 mol %, and $2 \times 10^{-4}$ mol of antimony trioxide was added as a catalyst per mol of the acid component to carry out a polycondensation reaction at 285° C. and 0.4 Torr, whereby a polyester having an intrinsic viscosity of 0.67 was prepared.

The resulting polyester was melt spun in a conventional manner and then stretched. The stretched fiber was satisfactory in both color tone and yarn characteristics, but was insufficient in flame resistance such that the LOI thereof was 21.2 and the flame contact number was 1.6.

EXAMPLE 5

BHET was introduced into an esterification tank, and a slurry comprising TPA and EG at an EG/TPA mol ratio of 1.6 was continuously supplied thereto. The mixture was allowed to react at 250° C. and 0.05 kg/cm²G with an average residence time of 8 hours. BHET was thus obtained continuously at a conversion of 95%.

The resulting BHET was transferred to a polymerization tank and was heated to 280° C. There was then added thereto a 30% by weight solution in EG of phosphorus compound (A), prepared in the Reference Example, in an amount which gave a phosphorus compound concentration in the final polyester of 5 mol %, and $2 \times 10^{-4}$ mol of antimony trioxide was added as a catalyst per mol of the acid component to carry out a polycondensation reaction at 285° C. and 0.4 Torr, whereby a polyester having an intrinsic viscosity of 0.66 was obtained. (This polyester is hereinafter referred to as "Polyester I").

Also, the same BHET as above was transferred to a polymerization tank and a polycondensation was conducted in the same manner as above except that the phosphorus compound was not added, whereby a polyester having an intrinsic viscosity of 0.67 was obtained. (This polyester is hereinafter referred to as "Polyester II").

Polyester I and Polyester II were fed to an extruder at a weight ratio of 1:1 to conduct melt blending, and the product then spun and stretched in a conventional manner to produce a fiber.

The properties of the resulting fiber are given in the Table.

As described above, the present invention provides economical production of polyesters and polyester fibers which have excellent flame resistance (LOI of 23 or more, a flame contact number of 3 or more) as well as a glass transition temperature of 65° C. or more, which polyesters are satisfactory in color tone, processability, and physical properties.

TABLE

| Example No. | Phosphorus Compound Type | Amount* Added (mol %) | Properties of Polyester | | | | | Properties of Fiber | | | | |
|---|---|---|---|---|---|---|---|---|---|---|---|---|
| | | | Intrinsic Viscosity | Tm (°C.) | Tg (°C.) | L-Value | a-Value | b-Value | Phosphorus Content (ppm) | LOI | Flame Contact Number(s) | Strength (g/d) | Elongation (%) |
| 1 | (A) | 5.0 | 0.67 | 247 | 74 | 59 | −1.4 | 5.8 | 7840 | 31.6 | 5.0 | 4.58 | 32.8 |
| 2 | (A) | 3.0 | 0.68 | 253 | 76 | 72 | −1.3 | 4.7 | 4750 | 28.9 | 3.8 | 4.72 | 31.2 |
| 3 | (A) | 10.0 | 0.63 | 244 | 72 | 55 | −2.1 | 6.3 | 15200 | 34.2 | 5.0 | 4.34 | 31.7 |
| 4 | (B) | 5.0 | 0.65 | 248 | 75 | 61 | −1.9 | 5.8 | 7830 | 31.1 | 5.0 | 4.56 | 31.4 |
| 5 | — | — | — | — | — | — | — | — | 3770 | 29.4 | 3.8 | 4.82 | 32.6 |

*Amount to be added is represented by the phosphorus compound concentration in the final polyester.

While the invention has been described in detail and with reference to specific embodiments thereof, it will be apparent to one skilled in the art that various changes and modifications can be made therein without departing from the spirit and scope thereof.

What is claimed is:

1. A flame resistant polyester produced by addition and copolymerization of a phosphorus compound represented by general formula (i) below as a diol component of the polyester in an amount of 500 ppm or more in terms of phosphorus atom content in the polyester, which polyester has alkylene terephthalate units as main repeating units and which has an intrinsic viscosity of not less than 0.5 measured at 20° C. in a mixture of equal weight of phenol and tetrachloroethane:

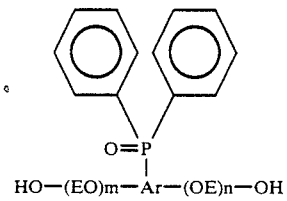

(I)

where E is —CH$_2$CH$_2$—, Ar is an aromatic group or an aromatic group substituted by a lower alkyl group or a halogen atom, and m and n denote, respectively, integers the sum of which is from 1 to 20.

2. A polyester as set forth in claim 1, wherein the phosphorus compound is represented by formula (A):

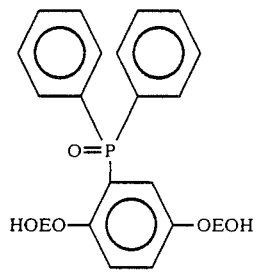

(A)

3. A polyester as set forth in claim 1, wherein the phosphorus compound is represented by formula (B):

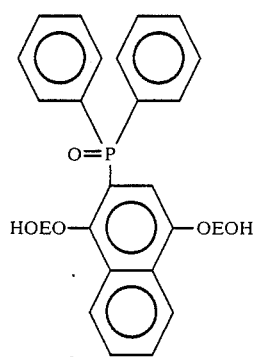

(B)

4. A polyester as set forth in claim 1, wherein the content of phosphorus atom content is within the range of from 1,000 to 30,000 ppm.

5. A flame resistant polyester fiber comprising the polyester as set forth in claim 1.

* * * * *